(12) United States Patent
Berry et al.

(10) Patent No.: US 9,110,736 B2
(45) Date of Patent: *Aug. 18, 2015

(54) INTERFACING BETWEEN A CALLER APPLICATION AND A SERVICE MODULE

(75) Inventors: Charles Franklin Berry, Apalachin, NY (US); Glenn C. Godoy, Endwell, NY (US); Amy Jeanne Snavely, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 13/596,432

(22) Filed: Aug. 28, 2012

(65) Prior Publication Data

US 2012/0324475 A1 Dec. 20, 2012

Related U.S. Application Data

(63) Continuation of application No. 12/102,492, filed on Apr. 14, 2008, now Pat. No. 8,286,186.

(51) Int. Cl.
*G06F 9/54* (2006.01)
*G06Q 30/06* (2012.01)
*G06Q 10/06* (2012.01)

(52) U.S. Cl.
CPC ........ *G06F 9/54* (2013.01); *G06F 9/541* (2013.01); *G06F 9/547* (2013.01); *G06Q 10/06* (2013.01); *G06Q 30/0633* (2013.01)

(58) Field of Classification Search
CPC .......... G06F 9/547; G06F 9/541; G06F 9/54; G06Q 30/0633
See application file for complete search history.

(56) References Cited

U.S. PATENT DOCUMENTS

| 7,039,919 | B1 | 5/2006 | Hunt |
| 7,219,327 | B1 | 5/2007 | Jacobs et al. |
| 7,702,724 | B1 * | 4/2010 | Brydon et al. ............... 709/203 |
| 8,286,186 | B2 | 10/2012 | Berry et al. |
| 8,898,679 | B2 | 11/2014 | Berry et al. |
| 2002/0165872 | A1 | 11/2002 | Meltzer |

(Continued)

OTHER PUBLICATIONS

Office Action (Mail Date Feb. 13, 2012) for U.S. Appl. No. 12/102,492, filed Apr. 14, 2008.

(Continued)

*Primary Examiner* — Charles E Anya
(74) *Attorney, Agent, or Firm* — Schmeiser, Olsen & Watts, LLP; John R. Pivnichny (57) ABSTRACT

A method and associated system for interfacing between a caller application and a service module. Upon receiving a request for performing a transaction that includes at least one caller application attribute describing the request, the service module builds a service module data structure pursuant to the received request. The service module data structure includes a generic service document and at least one service module attribute. Each service module attribute is stored in a relational table of the service module data structure, which includes. The request is serviced within the service module data structure, resulting in instantiating the generic service document. The generic service document is returned to the caller application. Servicing the request includes: servicing comprising: performing the transaction; reloading containers from the relational table into respective containers of the generic service document; and returning the generic service document to the caller application.

16 Claims, 6 Drawing Sheets

(56) References Cited

U.S. PATENT DOCUMENTS

| | | |
|---|---|---|
| 2004/0221001 A1 | 11/2004 | Anagol-Subbarao et al. |
| 2007/0282616 A1 | 12/2007 | Brunswig et al. |

OTHER PUBLICATIONS

Amendment filed May 2, 2012 in response to Office Action (Mail Date Feb. 13, 2012) for U.S. Appl. No. 12/102,492, filed Apr. 14, 2008.

Notice of Allowance (Mail Date May 30, 2012) for U.S. Appl. No. 12/102,492, filed Apr. 14, 2008.

U.S. Appl. No. 13/596,396, filed Aug. 28, 2012; First Named Inventor: Charles Franklin Berry.

Amendment (filed Jun. 11, 2014) for U.S. Appl. No. 13/596,396, filed Aug. 28, 2012.

Office Action (Mail Date Mar. 12, 2014) for U.S. Appl. No. 13/596,396, filed Aug. 28, 2012.

Notice of Allowance (mail date Jul. 16, 2014) for U.S. Appl. No. 13/596,396, filed Aug. 28, 2012.

* cited by examiner

INTERFACING BETWEEN A CALLER APPLICATION AND A SERVICE MODULE

This application is a continuation application claiming priority to Ser. No. 12/102,492, filed Apr. 14, 2008, now U.S. Pat. No. 8,286,186 issued Oct. 9, 2012.

FIELD OF THE INVENTION

The present invention discloses a system and associated method for a data interface that differentiates multiple caller applications requesting a service of a commonly callable service application.

BACKGROUND OF THE INVENTION

A conventional service application that is shared by multiple caller applications cannot extend a data model of a caller application in a data model of the conventional service application. Also, the conventional service application interferes with the data model of the caller application in performing a service requested by the caller application. Also, the conventional service application uses a data interface that may confuse identities of data elements of caller applications. Thus, there is a need for a system and associated method that overcomes at least one of the preceding disadvantages of current methods and systems for a data interface of a shared service application.

SUMMARY OF THE INVENTION

The present invention provides a method for interfacing between a caller application and a service module, the method comprising:
  receiving a request for performing a transaction from the caller application, wherein the request comprises at least one caller application attribute describing the transaction;
  subsequent to said receiving, building a service module data structure pursuant to said received request, wherein the service module data structure comprises a generic service document and at least one service module attribute, wherein the service module uses only the service module data structure such that the service module needs not manipulate said at least one caller application attribute in performing the transaction;
  subsequent to said building, storing each service module attribute of said at least one service module attribute in a relational table of the service module data structure;
  subsequent to said storing, servicing the request within the service module data structure, wherein said servicing results in instantiating the generic service document; and
  subsequent to said servicing, returning the generic service document to the caller application,
  wherein said receiving, said building, said storing, said servicing, and said returning are performed by the service module.

The present invention provides a computer program product, comprising a computer usable medium having a computer readable program code embodied therein, said computer readable program code containing instructions that when executed by a processor of a computer system implement a method for interfacing between a caller application and a service module, the method comprising:
  receiving a request for performing a transaction from the caller application, wherein the request comprises at least one caller application attribute describing the transaction;
  subsequent to said receiving, building a service module data structure pursuant to said received request, wherein the service module data structure comprises a generic service document and at least one service module attribute, wherein the service module uses only the service module data structure such that the service module needs not manipulate said at least one caller application attribute in performing the transaction;
  subsequent to said building, storing each service module attribute of said at least one service module attribute in a relational table of the service module data structure;
  subsequent to said storing, servicing the request within the service module data structure, wherein said servicing results in instantiating the generic service document; and subsequent to said servicing, returning the generic service document to the caller application,
  wherein said receiving, said building, said storing, said servicing, and said returning are performed by the service module.

The present invention provides a computer system comprising a processor and a computer readable memory unit coupled to the processor, said memory unit containing instructions that when executed by the processor implement a method for interfacing between a caller application and a service module, the method comprising:
  receiving a request for performing a transaction from the caller application, wherein the request comprises at least one caller application attribute describing the transaction;
  subsequent to said receiving, building a service module data structure pursuant to said received request, wherein the service module data structure comprises a generic service document and at least one service module attribute, wherein the service module uses only the service module data structure such that the service module needs not manipulate said at least one caller application attribute in performing the transaction;
  subsequent to said building, storing each service module attribute of said at least one service module attribute in a relational table of the service module data structure;
  subsequent to said storing, servicing the request within the service module data structure, wherein said servicing results in instantiating the generic service document; and
  subsequent to said servicing, returning the generic service document to the caller application,
  wherein said receiving, said building, said storing, said servicing, and said returning are performed by the service module.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for interfacing between a caller application and a service module, the method comprising:
  receiving a request for performing a transaction from the caller application, wherein the request comprises at least one caller application attribute describing the transaction;
  subsequent to said receiving, building a service module data structure pursuant to said received request, wherein the service module data structure comprises a generic service document and at least one service module attribute, wherein the service module uses only the service module data structure such that the service module needs not manipulate said at least one caller application attribute in performing the transaction;

subsequent to said building, storing each service module attribute of said at least one service module attribute in a relational table of the service module data structure;

subsequent to said storing, servicing the request within the service module data structure, wherein said servicing results in instantiating the generic service document; and subsequent to said servicing, returning the generic service document to the caller application, wherein said receiving, said building, said storing, said servicing, and said returning are performed by the service module.

The present invention provides a method and system that overcomes at least one of the current disadvantages of conventional method and system for interfacing between a caller application and a shared service module.

DETAILED DESCRIPTION OF THE INVENTION

Figure 1:
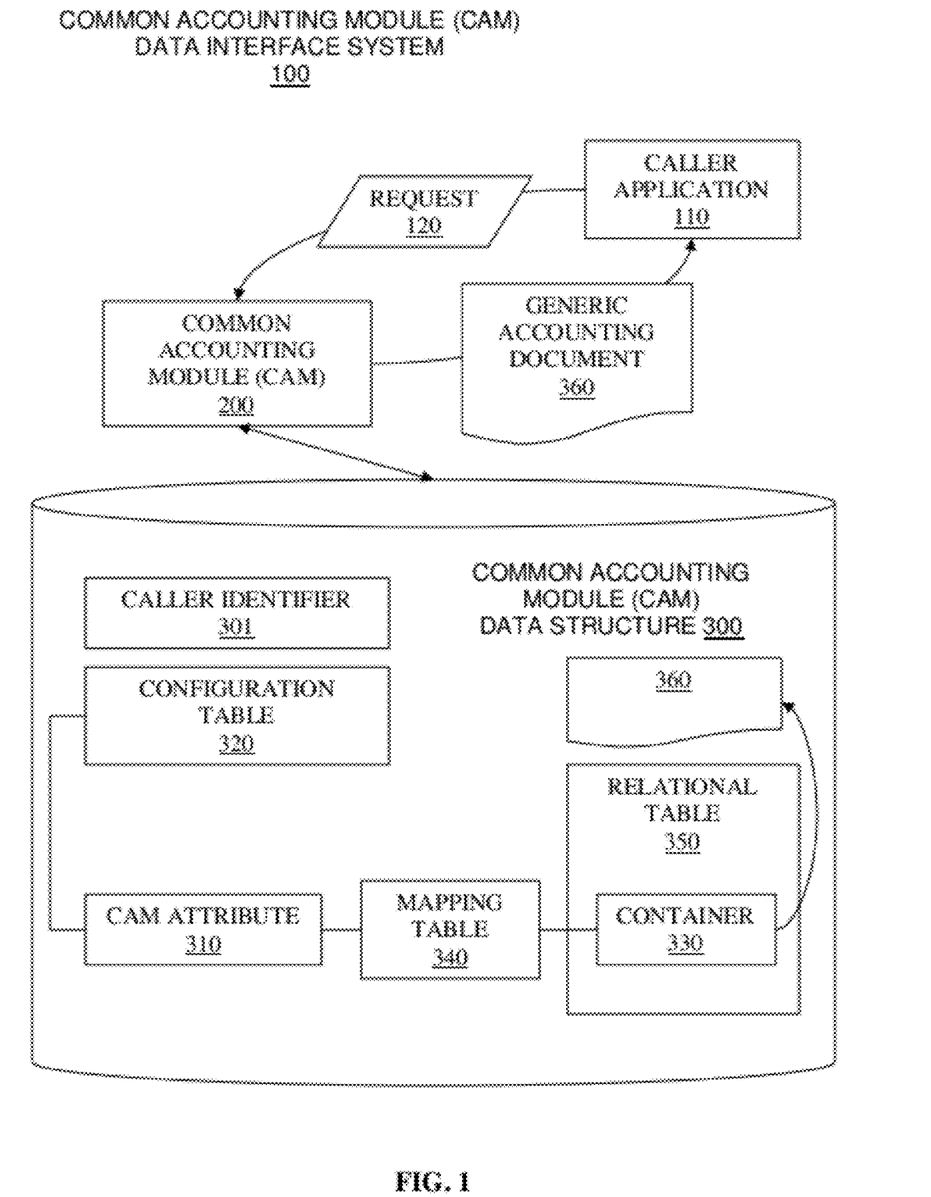
FIG. 1 illustrates a shared service module data interface system, in accordance with embodiments of the present invention.

FIG. 1 illustrates a shared service module data interface system, in accordance with embodiments of the present invention.

The shared service module data interface system comprises a caller application 110, a shared service module, and a shared service module data structure. The caller application 110 sends a request 120 to the shared service module for a transaction that is performed by the shared service module. In this embodiment, the shared service module data interface system is a common accounting module (CAM) data interface system 100, the shared service module is a common accounting module (CAM) 200, the shared service module data structure is a common accounting module (CAM) data structure 300, and the transaction is an accounting service.

The CAM data structure 300 comprises a caller identifier 301, at least one CAM attribute 310, a configuration table 320, at least one container 330, a mapping table 340, a relational table 350, and a generic accounting document 360.

The caller identifier 301 differentiates each caller application 110 that requests an accounting service of the CAM 200. The caller identifier 301 is configured by the CAM 200 and identifies all data associated with the caller application 110 within the CAM data structure 300. Data that are specific to each caller application 110 are produced while the CAM 200 performs an accounting function according to the request 120 from the caller application 110. Thus, a single web application instance of the CAM 200 concurrently provides accounting services to multiple caller applications 110 that are uniquely identified by the caller identifier 301 through the CAM data interface system 100.

In one embodiment of the present invention, the caller identifier 301 is stored in a variable InstAppl_Id that is included in a document header. In another embodiment, the caller identifier 301 is stored in another variable InstAppl_Id that is included in all data entities that are built up to service a request 120 from the caller application 110 that is identified by the caller identifier 301. The caller application 110 provides a value of the caller identifier 301 to the CAM 200. Examples of values of the caller identifier 301 include, inter alia, 'APU001', 'REQ001', and 'REQ002.' Each example value of the caller identifier 301 comprises an application number and a sequence number for a running instance. A pair of caller identifiers 301 'REQ001' and 'REQ002' of the example above represents that one caller application 110 that has the application number REQ has two running instances, and each of the running instances is uniquely identified with the sequence number followed by the application number, hence 'REQ001' and 'REQ002' comprises respective caller identifier 301.

The CAM attribute 310 describes properties of the request 120 within the CAM data structure 300. The CAM attribute 310 is identified from the request 120 and subsequently classified to service the request 120 from the caller application 110. The CAM attribute 310 comprises at least one part key. If the CAM attribute 310 comprises more than one part key, each part key is separated by a delimiter. The CAM 200 maintains the CAM attribute 310 without manipulating the CAM attribute while servicing the transaction requested by the caller application 110. Formats of the CAM attribute 310 may include, inter alia, a single column key, a multi-column key, etc. The single column key may be a unit data value such as 'AF34K1' which identifies a single purchase request. The multi-column key may be, for example, '631~03~420038688' which is a series of code representing hierarchical information of a purchase order by an entity, as a country, a company, and a serial number of the purchase order that has been made by the entity.

The configuration table 320 stores category and level information of all CAM attributes 310 that the CAM 200 needs to service the request 120 for the caller application 110. The CAM attribute 310 is categorized as one of two categories: a basic-category and an extended-category. Basic-category attributes are original to the caller application 110 that requests the CAM 200 to perform a transaction. Both the caller application 110 and the CAM 200 recognize basic-category attributes. Extended-category attributes are, on the other hand, not recognized by the CAM 200 without additional configuration. The CAM may recognize extended-category attributes either by additional configuration or by encoding of specific accounting rules and associating the encoded rules with extended-category attributes. The CAM 200 data model need not be changed in recognizing extended-category attributes as described above. Extended-category attributes may be defined for a specific entity that manipulates the requested accounting function. The CAM attribute 310 is also divided into two levels, a header-level and an item-level, independent of a category of the CAM attribute 310. The header-level attribute is applicable to all items in a service document with a header comprising the header-level attribute. The item-level attribute is applicable only to an item within a service document that is described by the item-level attribute. Information on both the category and the level of a CAM attribute is collectively referred to as classification information in this specification.

A container 330 is created within the generic accounting document 360 for each CAM attribute 310 to hold a data value of an associated CAM attribute 310. Each container 330 is classified according to the category and the level information of a respective CAM attribute 310 for which the container 330 holds a data value.

The mapping table 340 comprises information regarding association between each CAM attribute 310 and a respective container 330 that corresponds to each CAM attribute 310. See description of the mapping table 340 in FIG. 2, infra.

The relational table 350 is a set of CAM attributes 310 in the CAM data structure 300. The relational table 350 is classified as one of four tables that store a respective CAM attribute 310 according to the category and the level information of the CAM attribute 310: a document header table that comprises basic-category and header-level attributes, a document item table that comprises basic-category and item-level attributes, a document header extension table that comprises extended-category and header-level attributes, and a document item extension table that comprises extended-category and item-level attributes.

The generic accounting document 360 comprises containers 330 and is returned to the caller application 110 after servicing the request 120.

Figure 2:
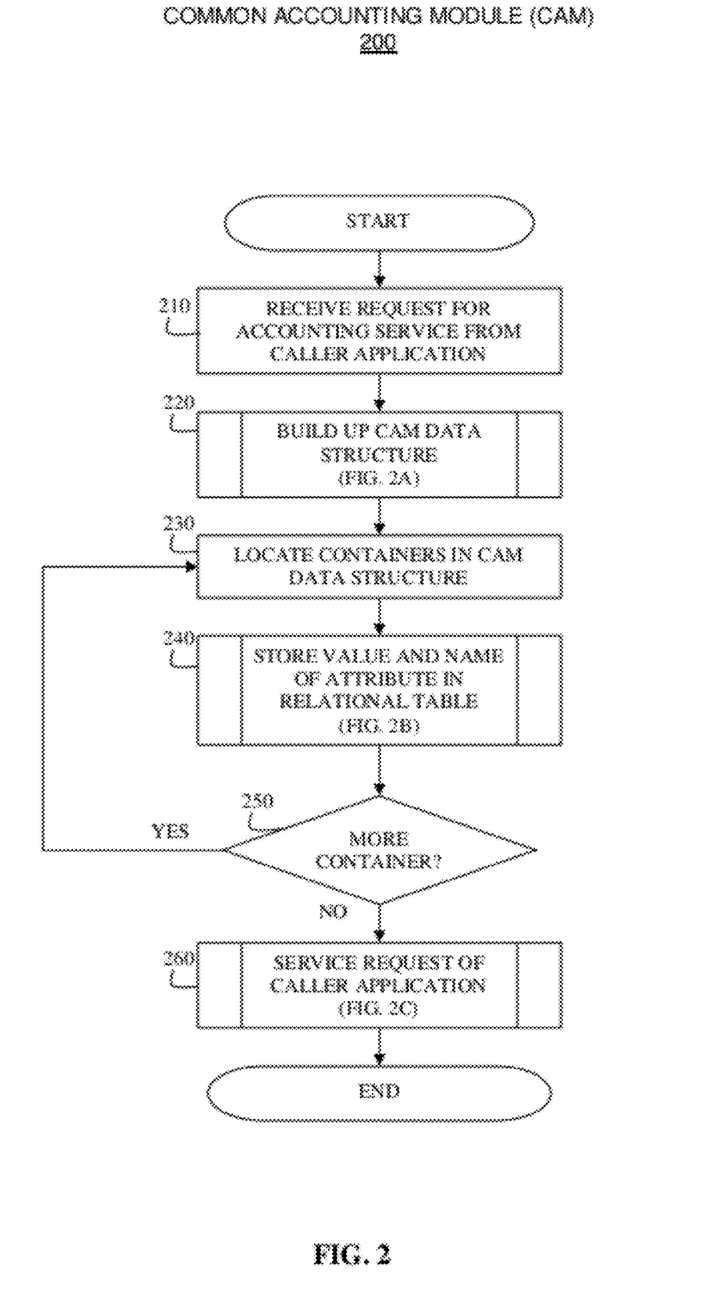
FIG. 2 is a flowchart depicting a method for a common accounting module data interface system of FIG. 1, in accordance with the embodiments of the present invention.

FIG. 2 is a flowchart depicting a method for a common accounting module data interface system of FIG. 1, supra, in accordance with the embodiments of the present invention.

In step 210, the common accounting module (CAM) receives a request for an accounting service from a caller application. Examples of the accounting service may include, inter alia, a data collection, a data validation, a purchase, etc.

In step 220, the CAM builds up a relational table in the CAM data structure comprising containers. See FIG. 2A, infra, for details.

In step 230, the CAM determines a storage location of each container that is a column and/or a row in the relational table built in step 220.

In step 240, the CAM stores a CAM attribute associated with the located container from step 230. See FIG. 2B, infra, for details.

In step 250, the CAM determines if there is a container that does not hold a data value for an associated CAM attribute left unprocessed. If the CAM determines that there is a container left unprocessed, the CAM loops back to step 230 and re-performs steps 230, 240, and 250. If the CAM determines that there are no more containers left, then the CAM proceeds with step 260.

In step 260, the CAM services the request from the caller application. See FIG. 2C, infra, for details.

Figure 2A:
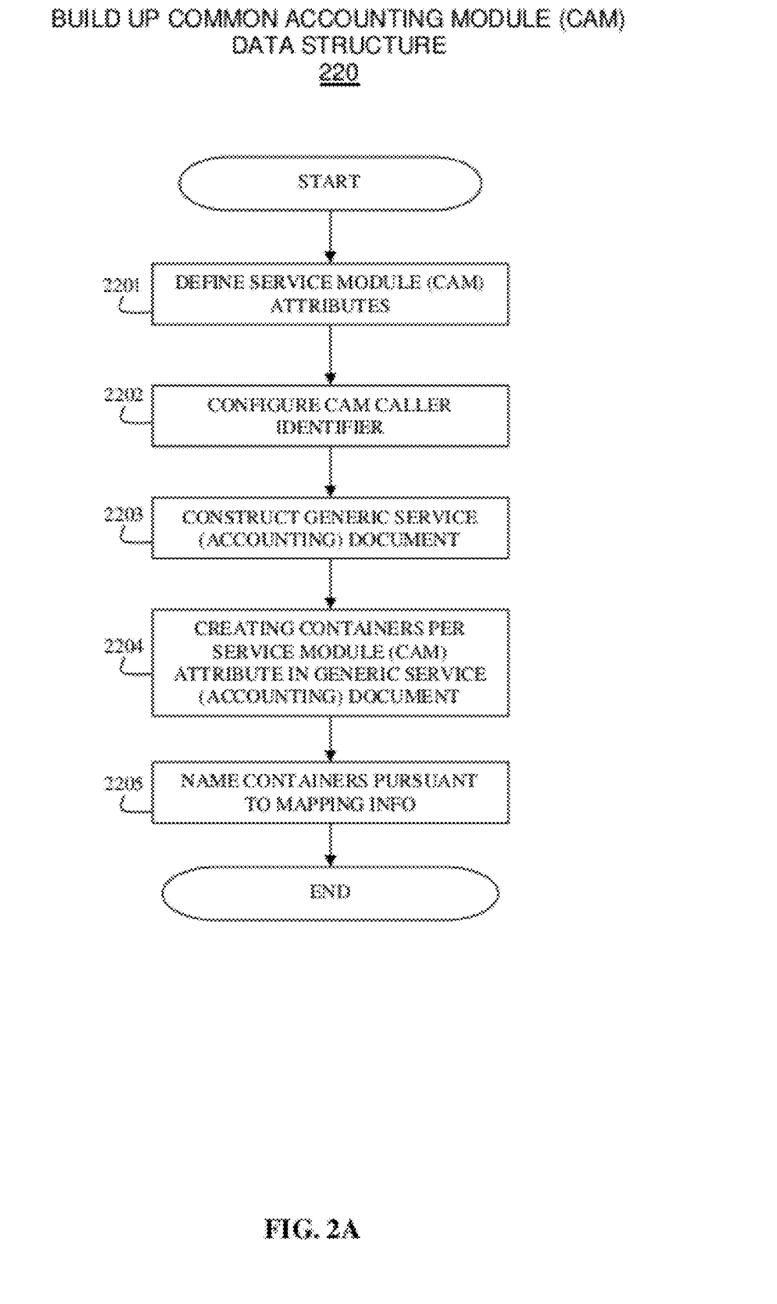
FIG. 2A is a flowchart depicting a method for building up the CAM data structure of FIG. 1, in accordance with the embodiments of the present invention.

FIG. 2A is a flowchart depicting a method for building up the CAM data structure of FIG. 1, supra, in accordance with the embodiments of the present invention.

In step 2201, the CAM identifies and classifies attributes that are necessary to the accounting process in the request. The CAM data interface instantiates a configuration table in the CAM data structure with item identity and classification information.

In step 2202, the CAM configures a caller identifier that is unique to each caller application. The CAM differentiates transactional data of one caller application from the other caller application with the caller identifier. The caller identifier is used to compose the primary key of all stored transactional data as to the service of the request. Consequently, the CAM may service multiple caller applications within an instance without confusing identities of each caller application.

In step 2203, the CAM creates a generic accounting document which represents the business transaction or purchasing document, parsing the input stream and assembling the CAM data structure.

In step 2204, the CAM creates a container per CAM attribute, and attaches created containers to the generic accounting document. The container holds a data value of a corresponding CAM attribute. These containers hold the business data values. When each container is created, each container is associated with respective CAM attribute in each mapping. All mapping is stored in a mapping table.

In step 2205, the CAM reads the mapping table and obtains names of CAM attributes. The CAM interface program assigns the CAM attribute names to each container using the mapping table.

By using the mapping table, the method of the present invention can dynamically extend a data structure in order to share existing application system data from multiple caller applications. A data structure of the CAM, i.e., the CAM data structure, and a data structure of the caller application independently operate without exposing respective data structure to each other. Two independent data structures of the CAM and the caller application are associated by a name, a position, and a combination of the name and the position, and information regarding this association is stored in the mapping table.

In one embodiment of the present invention, the CAM associates a data element of the caller application, i.e., an attribute, with a data item of the CAM, i.e., a container, by a name. Respective data of the CAM and the caller application are associated solely by the name of the data, without regarding a position of the data element by the CAM.

In another embodiment of the present invention, the CAM associates a data element of the caller application, i.e., an attribute, with a data item of the CAM, i.e., a container, by a position in a set of data elements. Thus, the CAM uses the position of the data element in the set of data elements of the caller application in identifying the data element and locating storage of the data item as stored within the CAM data structure. If no data element is named in the request of the caller application, the CAM maps all data elements by the position of the data element.

In still another embodiment of the present invention, the CAM associates a data element of the caller application, i.e., an attribute, with a data item of the CAM, i.e., a container, by a name of the data element and a position in a set of data elements. In the same embodiment, the CAM uses a name of the data element for some data elements in combination with the position to assure proper association of data elements. For a named data element, a position of the named data element is assumed to be honored for all data elements and the position of the named data element is checked by the CAM. If the named data element is not in a defined position, then an unnamed data element is assumed to be in a correct position relative to the position of the named data element within a set of data elements. If the named element is in the defined position, then all data elements are handled by respective position.

Figure 2B:
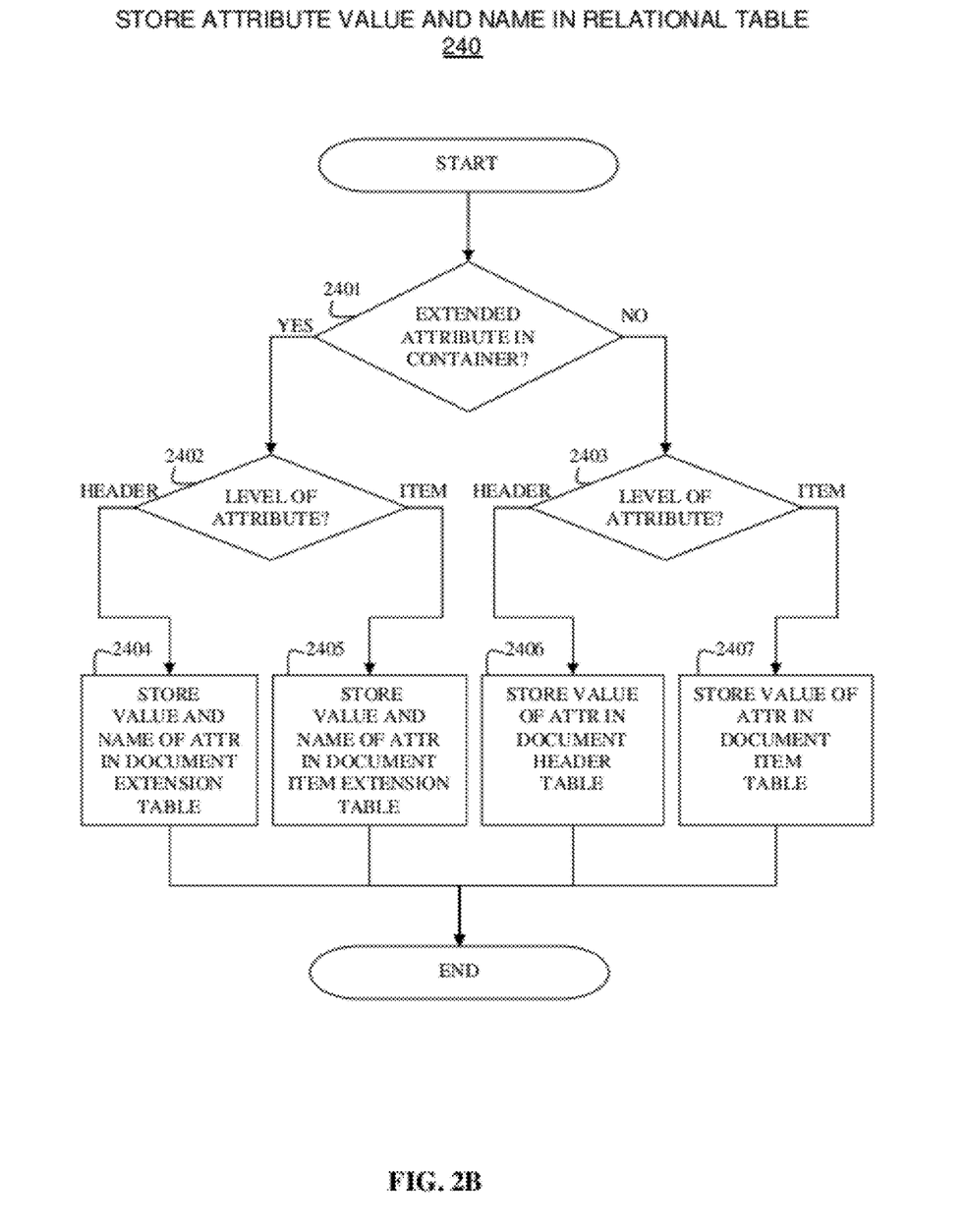
FIG. 2B is a flowchart depicting a method for storing CAM attributes in the CAM data structure of FIG. 1, in accordance with the embodiments of the present invention.

FIG. 2B is a flowchart depicting a method for storing CAM attributes in the CAM data structure of FIG. 1, supra, in accordance with the embodiments of the present invention.

Steps 2401 to 2407 are performed on each container located in step 230 of FIG. 2, supra.

In step 2401, the CAM determines whether the container holds an extended attribute by looking up the configuration table that comprises classification information, i.e., a category and a level, of CAM attributes. If the CAM determines that the container holds an extended-category attribute, the CAM proceeds with step 2402. If the CAM determines that the container does not hold an extended-category attribute, the CAM proceeds with step 2403.

In step 2402, the CAM determines whether the container is either a header-level container or an item-level container. If the CAM determines that the container is a header-level container, the CAM proceeds with step 2404. If the CAM determines that the container is an item-level container, the CAM proceeds with step 2405.

In step 2403, the CAM determines whether the container is either a header level container or an item level container. If the CAM determines that the container is a header level container, the CAM proceeds with step 2406. If the CAM determines that the container is an item level container, the CAM proceeds with step 2407.

In step 2404, because the CAM had determined that the container has an extended attribute in a header level container, the CAM stores the container comprising a name and a value of the extended attribute as a row in a document extension data store that is designated to store an extended-header level container.

In step 2405, because the CAM had determined that the container has an extended attribute in an item level container, the CAM stores the container comprising a name and a value of the extended attribute as a row in a document item extension data store that is designated to store an extended-item level container.

In step 2406, because the CAM had determined that the container has a basic attribute in a header level container, the CAM stores the container comprising a value of the basic attribute as a column in a document header table that is designated to store a basic-header level container.

In step 2407, because the CAM had determined that the container has a basic attribute in an item level container, the CAM stores the container comprising a value of the basic attribute as a column in a document item table that is designated to store a basic-item level container.

After the CAM performs one of steps 2404, 2405, 2406, or 2407, the CAM proceeds with step 250 in FIG. 2, supra.

Figure 2C:
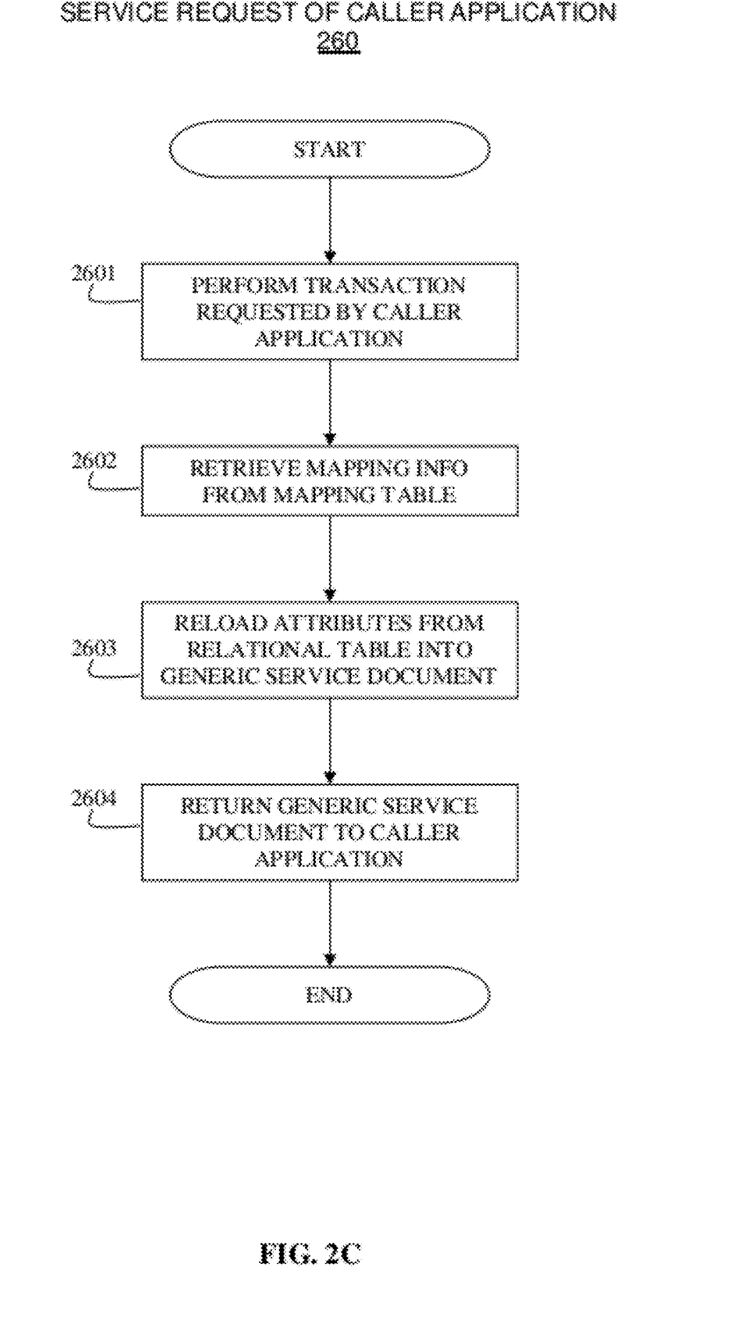
FIG. 2C is a flowchart depicting a method for servicing the request of the caller application, in accordance with the embodiments of the present invention.

FIG. 2C is a flowchart depicting a method for servicing the request of the caller application, in accordance with the embodiments of the present invention.

In step 2601, the CAM performs the data validation or collection request from the caller application as received in step 210 of FIG. 2, supra.

In step 2602, the CAM reads the mapping table to find out container-attribute association and proper storage location for the attribute.

In step 2603, the CAM reloads accounting element types from data store into the generic document.

In step 2604, the CAM returns the generic document representing a document and/or a transaction to the caller application. The generic document that is passed to the caller application is by a position and a name of each attribute to accommodate an attribute locating system of the caller application.

Figure 3:
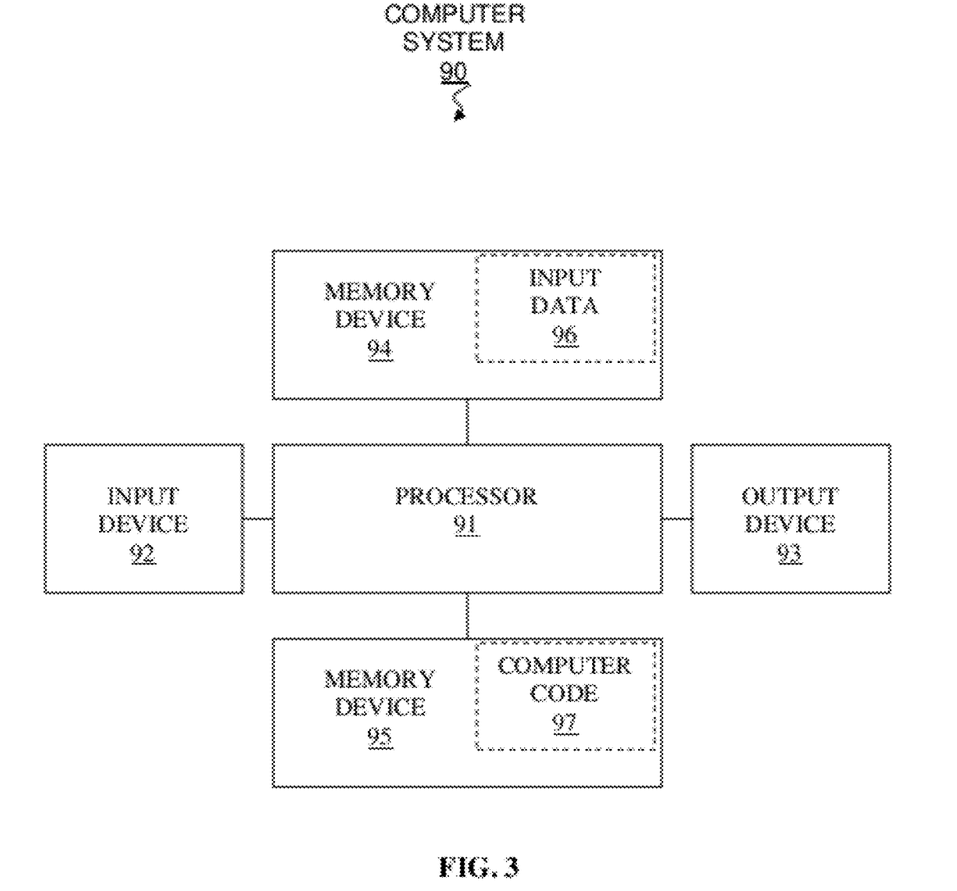
FIG. 3 illustrates a computer system used for extensible data interface for a shared service module, in accordance with embodiments of the present invention.

FIG. 3 illustrates a computer system 90 used for extensible data interface for a shared service module, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for extensible data interface for the shared service module, according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for extensible data interface for the shared service module of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for extensible data interface for the shared service module, In another embodiment, the invention provides a business method that performs the process steps of the invention on a subscription, advertising and/or fee basis. That is, a service provider, such as a Solution Integrator, can offer to create, maintain, support, etc. a process for extensible data interface for the shared service module of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method for interfacing between a caller application and a service module, said method comprising:

receiving, by a processor of a computer system, a request for performing a transaction from the caller application, wherein the request comprises at least one caller application attribute describing the request;

subsequent to said receiving, said processor building a service module data structure pursuant to the received request, wherein the service module data structure comprises a generic service document and at least one service module attribute, wherein the service module uses only the service module data structure such that the service module need not manipulate the at least one caller application attribute in performing the transaction;

subsequent to said building, said processor storing each service module attribute of the at least one service module attribute in a relational table of the service module data structure;

subsequent to said storing, said processor servicing the request within the service module data structure, wherein said servicing results in instantiating the generic service document; and subsequent to said servicing, said processor returning the generic service document to the caller application;

said service module being executed by the processor to perform said receiving the request, said building the service module data structure, said storing each service module attribute, said servicing the request, and said returning the generic service document;

said servicing comprising prior to said returning the generic service document:

performing the transaction;

subsequent to said performing the transaction, retrieving each mapping of at least one mapping in a mapping table of the service module data structure; and subsequent to said retrieving, reloading each container of at least one container from the relational table into respective containers of the generic service document according to each retrieved mapping, wherein a first container of the at least one container is pursuant to a category and a level of a first service module attribute that is associated with the first container.

2. The method of claim 1, said building comprising:

defining said at least one service module attribute of the service module data structure, wherein each service module attribute of the at least one service module attribute either corresponds to one caller application attribute of the at least one caller application attribute or is created by the service module;

subsequent to said defining, configuring a caller identifier that uniquely identifies the caller application which had sent the request and the service module data structure pursuant to the received request;

subsequent to said configuring, constructing the generic service document, wherein the generic service document is configured to contain a result of the performed transaction;

subsequent to said constructing, creating one or more containers in the generic service document, wherein each container of the one or more containers is respectively associated with each service module attribute in each mapping of the at least one mapping in the mapping table, wherein each container comprises a data value for each service module attribute of the at least one service module attribute; and subsequent to said creating, naming each container of said at least one container in the generic service document after each mapping of said at least one mapping in the mapping table.

3. The method of claim 1, said storing comprising:

determining a category of a first service module attribute of the at least one service module attribute, wherein a configuration table comprises a respective category of each service module attribute, wherein the category is either an extended-category that is recognized only by the caller application or a basic-category that is recognized by both the caller application and the service module;

subsequent to said determining the category, determining a level of the first service module attribute, wherein the configuration table further comprises a respective level of each service module attribute, wherein the level is either a header-level that is applicable for all service module attributes represented in the generic service document or an item-level that is applicable only for the first service module attribute;

subsequent to said determining the level, storing in the relational table a first container of at least one container, said first container being pursuant to the category and the level of the first service module attribute that is associated with the first container, wherein the relational table is selected from the group consisting of a first table for service module attributes determined to be in the basic-category and in the header-level, a second table for service module attributes determined to be in the basic-category and in the item-level, a third table for service module attributes determined to be in the extended-category and in the header-level, and a fourth table for service module attributes determined to be in the extended-category and in the item-level; and subsequent to said storing the first container, repeating to perform said determining the category, said determining the level, and said storing the first container after setting the first container with a next container in the relational table until all containers are stored in the relational table.

4. The method of claim 1, wherein the caller application is a member of a group comprising at least two caller applications, and wherein the service module is shared by each member of the group.

5. A computer program product, comprising a computer readable storage device having computer readable program code stored therein, said computer readable storage device not being a signal, said program code configured to be executed by a processor of a computer system to implement a method for interfacing between a caller application and a service module, said method comprising:

receiving, by a processor of a computer system, a request for performing a transaction from the caller application, wherein the request comprises at least one caller application attribute describing the request;
subsequent to said receiving, said processor building a service module data structure pursuant to the received request, wherein the service module data structure comprises a generic service document and at least one service module attribute, wherein the service module uses only the service module data structure such that the service module need not manipulate the at least one caller application attribute in performing the transaction;
subsequent to said building, said processor storing each service module attribute of the at least one service module attribute in a relational table of the service module data structure;
subsequent to said storing, said processor servicing the request within the service module data structure, wherein said servicing results in instantiating the generic service document; and
subsequent to said servicing, said processor returning the generic service document to the caller application;
said service module being executed by the processor to perform said receiving the request, said building the service module data structure, said storing each service module attribute, said servicing the request, and said returning the generic service document;
said servicing comprising prior to said returning the generic service document:
performing the transaction;
subsequent to said performing the transaction, retrieving each mapping of at least one mapping in a mapping table of the service module data structure; and
subsequent to said retrieving, reloading each container of at least one container from the relational table into respective containers of the generic service document according to each retrieved mapping, wherein a first container of the at least one container is pursuant to a category and a level of a first service module attribute that is associated with the first container.

6. The computer program product of claim 5, said building comprising:
defining said at least one service module attribute of the service module data structure, wherein each service module attribute of the at least one service module attribute either corresponds to one caller application attribute of the at least one caller application attribute or is created by the service module;
subsequent to said defining, configuring a caller identifier that uniquely identifies the caller application which had sent the request and the service module data structure pursuant to the received request;
subsequent to said configuring, constructing the generic service document, wherein the generic service document is configured to contain a result of the performed transaction;
subsequent to said constructing, creating one or more containers in the generic service document, wherein each container of the one or more containers is respectively associated with each service module attribute in each mapping of the at least one mapping in the mapping table, wherein each container comprises a data value for each service module attribute of the at least one service module attribute; and
subsequent to said creating, naming each container of said at least one container in the generic service document after each mapping of said at least one mapping in the mapping table.

7. The computer program product of claim 5, said storing comprising:
determining a category of a first service module attribute of the at least one service module attribute, wherein a configuration table comprises a respective category of each service module attribute, wherein the category is either an extended-category that is recognized only by the caller application or a basic-category that is recognized by both the caller application and the service module;
subsequent to said determining the category, determining a level of the first service module attribute, wherein the configuration table further comprises a respective level of each service module attribute, wherein the level is either a header-level that is applicable for all service module attributes represented in the generic service document or an item-level that is applicable only for the first service module attribute;
subsequent to said determining the level, storing in the relational table a first container of at least one container, said first container being pursuant to the category and the level of the first service module attribute that is associated with the first container, wherein the relational table is selected from the group consisting of a first table for service module attributes determined to be in the basic-category and in the header-level, a second table for service module attributes determined to be in the basic-category and in the item-level, a third table for service module attributes determined to be in the extended-category and in the header-level, and a fourth table for service module attributes determined to be in the extended-category and in the item-level; and
subsequent to said storing the first container, repeating to perform said determining the category, said determining the level, and said storing the first container after setting the first container with a next container in the relational table until all containers are stored in the relational table.

8. The computer program product of claim 5, wherein the caller application is a member of a group comprising at least two caller applications, and wherein the service module is shared by each member of the group.

9. A computer system comprising a processor, a memory coupled to the processor, and a computer readable storage device coupled to the processor, said storage device containing program code configured to be executed by the processor via the memory to implement a method for interfacing between a caller application and a service module, said method comprising:
receiving, by a processor of a computer system, a request for performing a transaction from the caller application, wherein the request comprises at least one caller application attribute describing the request;
subsequent to said receiving, said processor building a service module data structure pursuant to the received request, wherein the service module data structure comprises a generic service document and at least one service module attribute, wherein the service module uses only the service module data structure such that the service module need not manipulate the at least one caller application attribute in performing the transaction;
subsequent to said building, said processor storing each service module attribute of the at least one service module attribute in a relational table of the service module data structure;
subsequent to said storing, said processor servicing the request within the service module data structure, wherein said servicing results in instantiating the generic service document; and subsequent to said servicing, said processor returning the generic service document to the caller application;

said service module being executed by the processor to perform said receiving the request, said building the service module data structure, said storing each service module attribute, said servicing the request, and said returning the generic service document;

said servicing comprising prior to said returning the generic service document:
performing the transaction;
subsequent to said performing the transaction, retrieving each mapping of at least one mapping in a mapping table of the service module data structure; and
subsequent to said retrieving, reloading each container of at least one container from the relational table into respective containers of the generic service document according to each retrieved mapping, wherein a first container of the at least one container is pursuant to a category and a level of a first service module attribute that is associated with the first container.

10. The computer system of claim 9, said building comprising:
defining said at least one service module attribute of the service module data structure, wherein each service module attribute of the at least one service module attribute either corresponds to one caller application attribute of the at least one caller application attribute or is created by the service module;
subsequent to said defining, configuring a caller identifier that uniquely identifies the caller application which had sent the request and the service module data structure pursuant to the received request;
subsequent to said configuring, constructing the generic service document, wherein the generic service document is configured to contain a result of the performed transaction;
subsequent to said constructing, creating one or more containers in the generic service document, wherein each container of the one or more containers is respectively associated with each service module attribute in each mapping of the at least one mapping in the mapping table, wherein each container comprises a data value for each service module attribute of the at least one service module attribute; and
subsequent to said creating, naming each container of said at least one container in the generic service document after each mapping of said at least one mapping in the mapping table.

11. The computer system of claim 9, said storing comprising:
determining a category of a first service module attribute of the at least one service module attribute, wherein a configuration table comprises a respective category of each service module attribute, wherein the category is either an extended-category that is recognized only by the caller application or a basic-category that is recognized by both the caller application and the service module;
subsequent to said determining the category, determining a level of the first service module attribute, wherein the configuration table further comprises a respective level of each service module attribute, wherein the level is either a header-level that is applicable for all service module attributes represented in the generic service document or an item-level that is applicable only for the first service module attribute;
subsequent to said determining the level, storing in the relational table a first container of at least one container, said first container being pursuant to the category and the level of the first service module attribute that is associated with the first container, wherein the relational table is selected from the group consisting of a first table for service module attributes determined to be in the basic-category and in the header-level, a second table for service module attributes determined to be in the basic-category and in the item-level, a third table for service module attributes determined to be in the extended-category and in the header-level, and a fourth table for service module attributes determined to be in the extended-category and in the item-level; and
subsequent to said storing the first container, repeating to perform said determining the category, said determining the level, and said storing the first container after setting the first container with a next container in the relational table until all containers are stored in the relational table.

12. The computer system of claim 9, wherein the caller application is a member of a group comprising at least two caller applications, and wherein the service module is shared by each member of the group.

13. A process for supporting computer infrastructure, said process comprising providing at least one support service for at least one of creating, integrating, hosting, maintaining, and deploying computer-readable code in a computer system, wherein the code in combination with the computer system is configured to perform a method for interfacing between a caller application and a service module, said method comprising:
receiving, by a processor of a computer system, a request for performing a transaction from the caller application, wherein the request comprises at least one caller application attribute describing the request;
subsequent to said receiving, said processor building a service module data structure pursuant to the received request, wherein the service module data structure comprises a generic service document and at least one service module attribute, wherein the service module uses only the service module data structure such that the service module need not manipulate the at least one caller application attribute in performing the transaction;
subsequent to said building, said processor storing each service module attribute of the at least one service module attribute in a relational table of the service module data structure;
subsequent to said storing, said processor servicing the request within the service module data structure, wherein said servicing results in instantiating the generic service document; and
subsequent to said servicing, said processor returning the generic service document to the caller application;
said service module being executed by the processor to perform said receiving the request, said building the service module data structure, said storing each service module attribute, said servicing the request, and said returning the generic service document;
said servicing comprising prior to said returning the generic service document:
performing the transaction;
subsequent to said performing the transaction, retrieving each mapping of at least one mapping in a mapping table of the service module data structure; and
subsequent to said retrieving, reloading each container of at least one container from the relational table into respective containers of the generic service document according to each retrieved mapping, wherein a first container of the at least one container is pursuant to a category and a level of a first service module attribute that is associated with the first container.

14. The process of claim 13, said building comprising:

defining said at least one service module attribute of the service module data structure, wherein each service module attribute of the at least one service module attribute either corresponds to one caller application attribute of the at least one caller application attribute or is created by the service module;

subsequent to said defining, configuring a caller identifier that uniquely identifies the caller application which had sent the request and the service module data structure pursuant to the received request;

subsequent to said configuring, constructing the generic service document, wherein the generic service document is configured to contain a result of the performed transaction;

subsequent to said constructing, creating one or more containers in the generic service document, wherein each container of the one or more containers is respectively associated with each service module attribute in each mapping of the at least one mapping in the mapping table, wherein each container comprises a data value for each service module attribute of the at least one service module attribute; and subsequent to said creating, naming each container of said at least one container in the generic service document after each mapping of said at least one mapping in the mapping table.

15. The process of claim 13, said storing comprising:

determining a category of a first service module attribute of the at least one service module attribute, wherein a configuration table comprises a respective category of each service module attribute, wherein the category is either an extended-category that is recognized only by the caller application or a basic-category that is recognized by both the caller application and the service module;

subsequent to said determining the category, determining a level of the first service module attribute, wherein the configuration table further comprises a respective level of each service module attribute, wherein the level is either a header-level that is applicable for all service module attributes represented in the generic service document or an item-level that is applicable only for the first service module attribute;

subsequent to said determining the level, storing in the relational table a first container of at least one container, said first container being pursuant to the category and the level of the first service module attribute that is associated with the first container, wherein the relational table is selected from the group consisting of a first table for service module attributes determined to be in the basic-category and in the header-level, a second table for service module attributes determined to be in the basic-category and in the item-level, a third table for service module attributes determined to be in the extended-category and in the header-level, and a fourth table for service module attributes determined to be in the extended-category and in the item-level; and subsequent to said storing the first container, repeating to perform said determining the category, said determining the level, and said storing the first container after setting the first container with a next container in the relational table until all containers are stored in the relational table.

16. The process of claim 13, wherein the caller application is a member of a group comprising at least two caller applications, and wherein the service module is shared by each member of the group.

* * * * *